United States Patent
Hara et al.

[11] Patent Number: 6,132,488
[45] Date of Patent: Oct. 17, 2000

[54] PROCESS OF TREATING WASTE CONTAINING ZINC OXIDE

[75] Inventors: Toshikatu Hara, Nisshin; Hirohiko Sasamoto, Aichi-ken; Yuji Okada; Kazuhiro Suzuki, both of Toyota, all of Japan

[73] Assignees: Aichi Steel Works, Ltd., Tokai; Toyota Jidosha Kabushiki Kaisha; Toyokin Co., Ltd., both of Toyota, all of Japan

[21] Appl. No.: 09/125,029
[22] PCT Filed: Feb. 12, 1997
[86] PCT No.: PCT/JP97/00372
  § 371 Date: Aug. 14, 1998
  § 102(e) Date: Aug. 14, 1998
[87] PCT Pub. No.: WO97/30182
  PCT Pub. Date: Aug. 21, 1997

[30] Foreign Application Priority Data

Feb. 16, 1996 [JP] Japan ................... 8-054223

[51] Int. Cl.[7] ........................................ C22B 7/02
[52] U.S. Cl. .................... 75/431; 75/432; 75/658; 75/693; 75/961; 423/464; 423/466; 423/500
[58] Field of Search .................. 75/657, 658, 693, 75/431, 432, 961; 423/464, 466, 500

[56] References Cited

U.S. PATENT DOCUMENTS

| | | | |
|---|---|---|---|
| 4,673,431 | 6/1987 | Bricmont | 75/694 |
| 5,004,496 | 4/1991 | Aune et al. | 75/10.28 |
| 5,350,438 | 9/1994 | Okada et al. | 75/401 |
| 5,871,561 | 2/1999 | Okada et al. | 75/658 |

FOREIGN PATENT DOCUMENTS

| | | |
|---|---|---|
| 42 09 891 | 9/1993 | Germany . |
| 4-2734 | 1/1992 | Japan . |
| 5-271799 | 10/1993 | Japan . |
| 6-108173 | 4/1994 | Japan . |
| 7-18346 | 1/1995 | Japan . |
| 7-505677 | 6/1995 | Japan . |
| 8-134557 | 5/1996 | Japan . |

OTHER PUBLICATIONS

*Derwent Abstracts*, AN 77–89200Y, JP 52 131903, Nov. 5, 1977.

*Primary Examiner*—Jill Warden
*Assistant Examiner*—Tima McGuthry-Banks
*Attorney, Agent, or Firm*—Oblon, Spivak, McClelland, Maier & Neustadt, P.C.

[57] ABSTRACT

A treating method of recovering zinc in the metal state from a waste containing the zinc in the oxide state, lead, chlorine, fluorine, and water comprising a mixing process 90 of obtaining a to-be-treated mixed material 70 by mixing a steel dust 7 and a reducing material 8 together; a chlorine recovery process 91 of recovering the chlorine and the water by heating the to-be-treated mixed material 70; a lead recovery process 92 of recovering fluorine and lead by heating the to-be-treated mixed material 70 under vacuum; a zinc recovery process 93 of recovering metallic zinc by heating the to-be-treated mixed material 70 at a temperature higher than that in the lead recovery process 92 with the vacuum state maintained so as to reduce and vaporize zinc; and a residue recovery process 94 of recovering a residue 79 of the to-be-treated mixed material 70. This construction allows the metallic zinc to be recovered at a high purity from a zinc oxide-containing waste and an on-site treatment to be accomplished.

23 Claims, 7 Drawing Sheets

PROCESS OF TREATING WASTE CONTAINING ZINC OXIDE

TECHNICAL FIELD

The present invention relates to a waste-treating method of recovering zinc in the metal state from wastes containing zinc in the oxide state.

BACKGROUND ART

Among various wastes generated by industrial production, those containing harmful substances such as zinc, lead, and the like are particularly required to be treated safely.

As the zinc-containing waste, there are one such as pressed scraps of galvanized sheets containing the zinc in the metal state and the other such as steel dust containing the zinc in the oxide state.

In the case of the zinc-containing waste in the metal state, as disclosed in Japanese Laid-Open Patent Publication No. 4-346681, it is possible to recover the zinc from the waste by heating the waste under vacuum to vaporize the zinc from steel. Thus, metal zinc can be recovered comparatively easily.

In the case of the zinc oxide-containing waste which contains the zinc in the oxide state, it is difficult to recover the metal zinc by the above-described method.

Thus, in treating the waste containing the zinc oxide, the following method is known: The waste is heated to a temperature of 1,200° C. or higher by means of a burner in a rotary kiln method so that the ZnO (zinc oxide) makes a reducing reaction with coke, coal, or the like.

However, since this method necessitates the waste to be heated to a very high temperature, it leads to a highly increased energy cost. Further, the method has another problem that the metal zinc obtained by reducing the zinc oxide is oxidized again when it is recovered and thus it is difficult to recover zinc in the metal state. Furthermore, the method is uneconomical unless the waste is treated in a large amount.

As another method, the zinc is vaporized by plasma at a high temperature to recover the zinc in the metal state by means of a lead splash condenser. However, it is difficult for this method to perform so-called on-site treatment that is capable of treating the whole amount of the generated waste at the site, such as a plant, where the waste has been generated, because this method exerts bad influence unavoidably on environment in treating the waste. Thus, it is necessary to transfer the waste to a specific waste-treating site having an environment-nonpolluting equipment.

Under these circumstances, the zinc is recovered in the zinc oxide state from a part of the waste containing the zinc oxide by a rotary kiln method and then the recovered zinc oxide is refined to recycle it, whereas the remaining part of the waste is transferred to the specific waste-treating site to have it reclaimed there, in consideration of the legal regulation.

However, it is difficult to continue to perform the above-mentioned controlled discard of the waste in the future due to problems such as a shortage of the waste-treating sites and a high processing cost.

Moreover, it is not economically preferable to discard materials such as the zinc contained in the waste without recycling them.

Under these circumstances, needs exist for the development of arts capable of recovering the zinc with other harmful substances from the waste containing the zinc oxide and recovering the zinc in the metal state at a high purity to recycle it.

Mr. Azakami et al. of Tohoku University proposed a two-stage vacuum-reducing method for recovering the metallic zinc from zinc oxide-containing waste (quoted from magazines of Japan Mining Industry Society, No. 1203 of volume 104, No. 1206 of volume 104 and No. 1209 of volume 104.) However, since CO gas is used to reduce iron oxide contained in the waste in the first stage of the two-stage vacuum-reducing method, and then the zinc is reduced by using the reduced iron obtained in the second stage, a reducing reaction that lasts for more than three hours is required. Thus, this method is not economical and difficult to industrialize accomplishment of the on-site treatment.

In view of the above-described conventional problems, it is accordingly an object of the present invention to provide a zinc oxide-containing waste-treating method capable of recovering metallic zinc therefrom at a high purity in a short time period and accomplishing the on-site treatment.

DISCLOSURE OF THE INVENTION

The invention, according to claim 1, discloses a treating method of recovering zinc in the metal state from a waste containing the zinc in the oxide state, lead, chlorine, fluorine, and water, comprising:

a mixing process of mixing the waste and a reducing material together to obtain a to-be-treated mixed material;

a chlorine recovery process of recovering the chlorine and the water by heating the to-be-treated mixed material;

a lead recovery process of recovering the fluorine and the lead by heating the to-be-treated mixed material under a vacuum state;

a zinc recovery process of reducing and vaporizing the zinc to recover metallic zinc by heating the to-be-treated mixed material at a temperature higher than that set in the lead recovery process, with the vacuum state maintained; and a residue recovery process of recovering a residue of the to-be-treated mixed material.

The most remarkable feature of this invention is that initially, the to-be-treated mixed material is prepared, and then, after the chlorine recovery process finishes, the lead recovery process and the zinc recovery process are performed under vacuum, and the heating temperature in the zinc recovery process is higher than that set in the lead recovery process.

The mixing process and the chlorine recovery process are not required to be carried out under vacuum but they are performed in an atmospheric environment.

It is necessary to carry out the lead recovery process and the zinc recovery process under vacuum and maintain the vacuum state when the execution of the lead recovery process is transferred to that of the zinc recovery process.

The residue recovery process may be carried out in the atmospheric environment, but as will be described later, when the residue is compression-molded into a briquette, preferably, the residue recovery process is performed in the vacuum state.

The heating oven may be changed for each process but one heating oven may be used for a plurality of processes. When one heating oven is used for a plurality of processes, a method of sequentially changing the heating condition can be adopted.

In the lead recovery process and the zinc recovery process and at the time of the transfer from the execution of the lead recovery process to that of the zinc recovery process, the heating oven having a function of maintaining the vacuum state is used.

The heating oven is required to be provided with a recovery container for recovering substances which have separated by means of vaporization or the like from the to-be-treated mixed material. In particular, a metallic zinc recovery container is provided with the heating oven which is used in the zinc recovery process.

As the reducing material, various industrial wastes, car dust, and the like containing carbon are used, as will be described later.

Preferably, the mixing ratio of the reducing material to the waste is 30–100 wt %. If the mixing amount of the reducing material is less than 30 wt %, the reducing reaction of zinc oxide does not occur sufficiently, whereas if the mixing amount of the reducing material is more than 100 wt %, the proportion of the reducing material which remains in the residue becomes too high.

The operation of the present invention will be described hereinafter.

In the present invention, initially, the waste and the reducing material are mixed together in the mixing process and then, the mixture is put into the heating oven for carrying out the chlorine recovery process.

Then, in the chlorine recovery process, the to-be-treated mixed material is heated to a temperature at which chlorine and water can be recovered. As a result, the chlorine and the water are separated from the to-be-treated mixed material and recovered.

Then, in the lead recovery process, after the inside of the heating oven provided with the to-be-treated mixed material is set to be under vacuum, the to-be-treated mixed material is heated to a temperature which is lower than the temperature at which the zinc oxide is reduced and lead and fluorine can be recovered. Consequently, the lead in an oxide state is reduced and vaporizes or volatilizes in the oxide state and recovered.

Then, in the zinc recovery process, the to-be-treated mixed material is heated at a temperature higher than that set in the lead recovery process, with the vacuum state maintained. That is, the to-be-treated mixed material is heated at a temperature higher than the temperature at which the zinc oxide is reduced. As a result, the zinc oxide is reduced by the reducing material and becomes metallic, thus vaporizing. Therefore, the zinc can be recovered in the metal state by the metallic zinc recovery container.

Then, the residue is recovered in the residue recovery process, and a part thereof can be recycled as a raw material of steel.

Further, in the present invention, because harmful substances can be sequentially recovered, as described above, no bad influence is exerted on the environment, and the treating time required to carry out each process is comparatively short.

Accordingly, an on-site treatment can be accomplished easily.

As defined in claim 2, it is preferable that the to-be-treated mixed material is heated at 40–600° C. in the chlorine recovery process. If the heating temperature is lower than 40° C., the chlorine cannot be recovered sufficiently. It is preferable that the heating temperature is higher than 200° C. If the heating temperature is higher than 600° C., even the zinc which should be recovered in one of the subsequent processes is recovered in the chlorine recovery process.

As defined in claim 3, preferably, the to-be-treated mixed material is heated at 200–600° C. in the lead recovery process. If the heating temperature is lower than 200° C., it is difficult to recover the lead. If the heating temperature is higher than 600° C., the zinc which should be recovered in the next process may be reduced by the reducing material and recovered in the lead recovery process.

As a method of providing a mixing process of mixing the reducing material with the to-be-treated mixed material after the chlorine recovery process and the lead recovery process finish without adding the reducing material to the to-be-treated mixed material and then performing the zinc recovery process and the residue recovery process, the following method is carried out.

That is, as defined in claim 4, there is provided a treating method of recovering zinc in the metal state from a waste containing zinc in the oxide state, lead, chlorine, fluorine, and water, comprising:

a chlorine recovery process of recovering the chlorine and the water by heating the waste;

a lead recovery process of recovering the fluorine and the lead by heating the waste in a vacuum state;

a mixing process of mixing a reducing material with the waste with the vacuum state maintained to obtain a to-be-treated mixed material;

a zinc recovery process of reducing and vaporizing the zinc to obtain metallic zinc by heating the to-be-treated mixed material, with the vacuum state maintained; and a residue recovery process of recovering a residue of the to-be-treated mixed material.

The characteristic of the invention of claim 4 is that as described above, the reducing material is not mixed with the waste until the zinc recovery process is carried out.

In this manner, the progress of the reducing reaction of the zinc oxide can be restrained to a possible highest degree in the processes prior to the zinc recovery process. Thus, the reducing and vaporization reactions of the zinc can be allowed to occur mainly in the zinc recovery process and hence, the recovery percentage of metallic zinc can be increased.

In the case of the method of mixing the reducing material with the waste in the first process, the zinc oxide will be reduced in a small amount and vaporize in the presence of the reducing material in the lead recovery process. Thus, there is a disadvantage that the amount of the metallic zinc which can be recovered in the subsequent zinc recovery process is reduced a little. The invention of claim 4 can get over this disadvantage.

In the lead recovery process, the lead can be recovered without the presence of the reducing material. This is because most of the lead contained in the waste volatilizes in the oxide state. Because the lead recovery process is performed under vacuum as described above, the volatile reaction can be easily accomplished at a temperature lower than that in the atmospheric pressure.

The invention of claim 4 is similar to that of the invention of claim 1 in other operations.

It is preferable to set the heating temperature as described below in each process in the invention of claim 4.

That is, as defined in claim 5, it is preferable that the waste is heated at 40–900° C. in the chlorine recovery process. If the waste is heated at a temperature lower than 40° C., it is difficult to recover chlorine sufficiently. It is preferable that the waste is heated at a heating temperature higher than 200° C. If the waste is heated at a temperature higher than 900° C., the zinc which should be recovered in one of the subsequent processes may be recovered in this process. It is preferable that the heating temperature is set to be lower than 750° C. It is preferable that as defined in claim 6, the waste is heated at 200–900° C. in the lead recovery process. If the heating temperature is lower than 200° C., there is a problem that it is difficult to recover the lead. If the heating temperature is even higher than 900° C., the effect of improving the recovery efficiency of the lead is still low. Thus, there is no effect in heating the waste at a temperature higher than 900° C.

The reason for that the upper limit temperature in the chlorine recovery process of the invention of claim 5 is set to be higher than that in the chlorine recovery process of the invention of claim 2 and the reason for that the upper limit temperature in the lead recovery process of the invention of claim 6 is set to be higher than that in the lead recovery process of the invention of claim 3 are because treatments in the inventions of claims 5 and 6 are carried out without mixing the reducing material with the waste, unlike the invention of claims 2 and 3.

In any one of the inventions of claims 1 through 6, the to-be-treated mixed material is preferably heated at 600–1,100° C. in the zinc recovery process, as defined in claim 7. If the heating temperature is lower than 600° C., the reducing reaction of the zinc does not occur sufficiently, whereas if the heating temperature is higher than 1,100° C., the energy cost required to heat the to-be-treated mixed material increases.

The present invention provides another method as follows:

As defined in claim 8, there is provided a treating method of recovering zinc in the metal state from a waste containing the zinc in the oxide state, lead, chlorine, fluorine, and water, comprising:

a mixing process of mixing the waste and a reducing material together to obtain a to-be-treated mixed material;

a chlorine and lead recovery process of recovering the lead, the chlorine, the fluorine, and the water by heating the to-be-treated mixed material;

a zinc recovery process of reducing and vaporizing the zinc to obtain metallic zinc by heating the to-be-treated mixed material in a vacuum state; and a residue recovery process of recovering a residue of the to-be-treated mixed material.

The most remarkable feature in the invention of claim 8 is that after the lead, the chlorine, fluorine, and water are recovered in one process (chlorine and lead recovery process), the zinc recovery process is carried out under vacuum.

According to this method, the metallic zinc can be recovered at a high purity by only two-time heating and further, the treatment period of time can be reduced. Thus, the method allows the on-site treatment to be accomplished more easily.

In the invention of claim 8, the chlorine and lead recovery process is performed in the atmospheric environment. That is, the fluorine and the lead can be recovered without producing a vacuum. This is because the reducing material makes a volatile action while it is making a reducing reaction.

The action which occurs in the zinc recovery process and that which occurs in the residue recovery process are similar to that of the invention of claim 1.

As defined in claim 9, it is preferable that the to-be-treated mixed material is heated at 40–750° C. in the chlorine and lead recovery process. If the heating temperature is lower than 40° C., it is difficult to recover the chlorine and the lead sufficiently, and preferably the heating temperature is set to be 200° C. or higher. If the heating temperature is higher than 750° C., the zinc which should be recovered in the next process may be recovered in this process due to the action of the reducing material. The reason for that the upper limit temperature in the invention of claim 9 is set to be higher than that set in the invention of claims 2 and 3 is because this process is carried out without producing a vacuum, unlike the invention of claims 2 and 3.

As defined in claim 10, it is preferable that the to-be-treated mixed material is heated at 600–1,100° C. in the zinc recovery process. If the heating temperature is lower than 600° C., the reducing reaction does not occur sufficiently. If the heating temperature is higher than 1,100° C., the energy cost is increased and a high heating performance is required, resulting in the higher cost of the equipment.

As defined in claim 11, in all the above-described methods, it is preferable that the residue is recovered by compression-molding the residue into a briquette, with the vacuum state maintained in the residue recovery process. In this manner, the residue can be compression-molded into the briquette without being oxidized. Therefore, the obtained briquette has a certain degree of strength because iron in the residue is sintered.

Therefore, the residue can be easily handled as the briquette. For example, it can be easily recycled as a raw material of steel.

As defined in claim 12, one or more industrial wastes selected from iron-containing industrial wastes which contains Fe and/or FeO and carbon-containing industrial wastes which contains carbon can be used as the reducing material. The invention of claim 12 eliminates the need for producing a particular reducing material, thus making it possible to utilize wastes in conformity to the object of the present invention.

The iron-containing industrial waste includes shot dust, hot scarfer dust, abrasive dust, and the like. The carbon-containing waste includes wood waste, sawdust, tire dust, and the like.

As defined in claim 13, car dust comprising organic substances recovered from materials of a discarded automotive body can be used as the reducing material. The invention of claim 13 allows the car dust to be effectively utilized without disposing at a very high cost.

As defined in claim 14, it is preferable that the degree of vacuum in the vacuum state in each of the processes is 0.001–20 Torr. The reason for that the preferable lower limit vacuum degree is set to 0.001 Torr is because the cost of the equipment is high to achieve a vacuum degree lower than 0.001 Torr and in addition, the reaction efficiency cannot be improved much is low even though a vacuum degree lower than 0.001 Torr is set as the lower limit vacuum degree in carrying out the treatments. The reason for that the preferable upper limit vacuum degree is set to 20 Torr is because at a vacuum degree higher than 20 Torr, a sufficient recovery percentage cannot be obtained.

Figure 1:
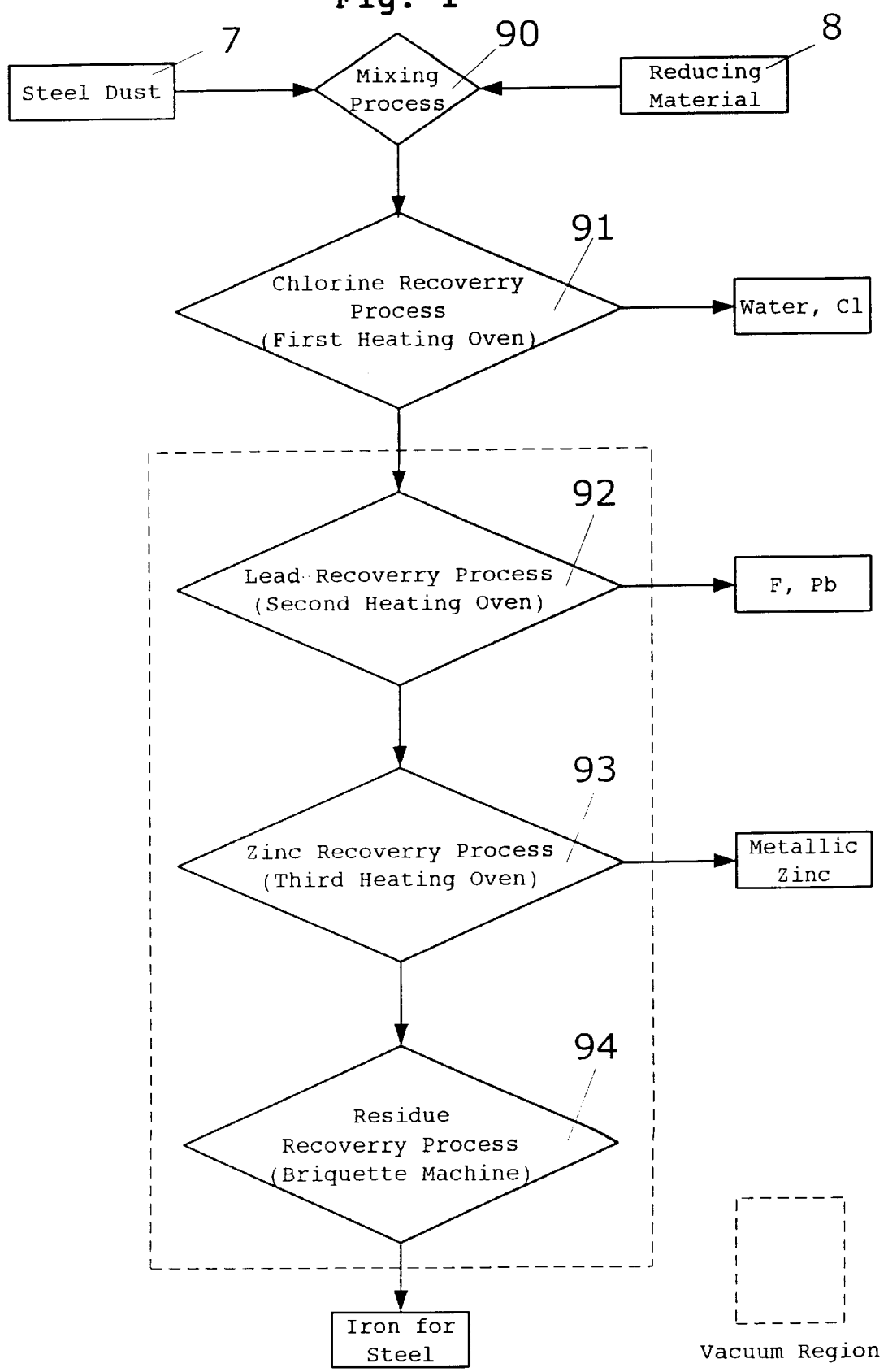
FIG. 1 is an explanatory view showing the process of a treating method according to Embodiment 1.

DESCRIPTION OF REFERENCE NUMERALS 1, 102: treating equipment
10: feeding portion
11: first heating oven
12: second heating oven
13: third heating oven
14: briquette machine
21–24: vacuum pump
31–34: material passageway
301–304: valve
41–44: first –fourth recovery container
52, 53: metal recovery container
7: steel dust
8: reducing material
90: mixing process
91: chlorine recovery process
910: chlorine and lead recovery process
92: lead recovery process
93: zinc recovery process
94: residue recovery process

BEST MODE FOR CARRYING OUT THE INVENTION

Embodiment 1

Figure 2:
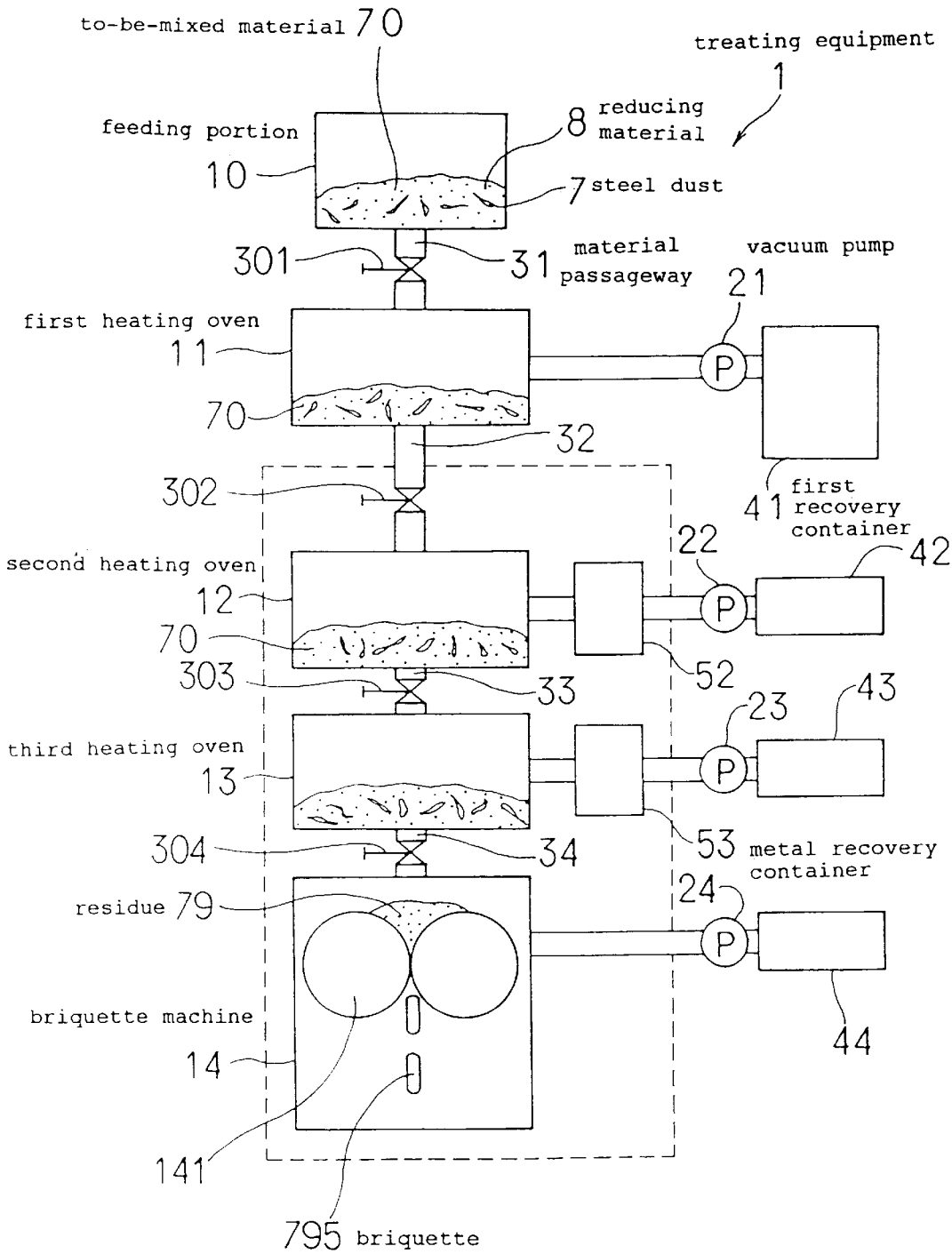
FIG. 2 is an explanatory view showing the construction of a treating equipment according to Embodiment 1.

With reference to FIGS. 1 and 2 and tables 1 through 4, the method of treating a zinc oxide-containing waste according to Embodiment 1 of the present invention will be described hereinafter.

As the method of Embodiment 1, the method of treating steel dust which is generated when steel is manufactured is described hereinafter.

As shown in table 1, the steel dust contains zinc in the oxide state, and contains lead, chlorine, fluorine, and water.

As shown in FIGS. 1 and 2, the steel dust is treated by a method comprising a mixing process 90 of obtaining a to-be-treated mixed material 70 by mixing a steel dust 7 and a reducing material 8 together; a chlorine recovery process 91 of recovering the chlorine and the water by heating the to-be-treated mixed material 70; a lead recovery process 92 of recovering fluorine and lead by heating the to-be-treated mixed material 70 under vacuum; a zinc recovery process 93 of recovering metallic zinc by heating the to-be-treated mixed material 70 at a temperature higher than that in the lead recovery process 92 so as to reduce and vaporize zinc, with the vacuum state maintained; and a residue recovery process 94 of recovering a residue 79 of the to-be-treated mixed material 70.

The method will be described in detail hereinafter.

Initially, as shown in FIG. 2, as the equipment for carrying out the method, an equipment 1 comprising a feeding portion 10, a first heating oven 11, a second heating oven 12, a third heating oven 13, and a briquette machine 14 is used.

The first heating oven 11, the second heating oven 12, the third heating oven 13, and the briquette machine 14 are connected with vacuum pumps 21–24, respectively. The atmosphere inside the second and third heating ovens 12 and 13 and the briquette machine 14 can be made vacuum by means of the vacuum pumps 22, 23, and 24, respectively.

As shown in FIG. 2, first through fourth recovery containers 41–44 are provided at the exhaust side of each of the vacuum pumps 21–24. Metal recovery containers 52 and 53 are interposed between the second heating oven 12 and the vacuum pump 22 and between the third heating oven 13 and the vacuum pump 23, respectively.

The first and second recovery containers 41 and 42 are charged with absorbent such as chlorine and fluorine and have a dust-recovering function, and the third and fourth recovery containers 43 and 44 have a dust-recovering function.

The metal recovery containers 52 and 53 recover metal by condensing vaporized metal and are constituted so as to be kept at a temperature lower than the condensation temperature of metal to be recovered.

As shown in FIG. 2, material passageways 31–34 for feeding the to-be-treated mixed material 70 are provided at the upstream and downstream sides of the respective heating ovens, and valves 301–304 are installed on the material passageways 31–34, respectively.

In treating the steel dust 7 by using the treating equipment 1, hot scarfer dust (FeO=99.5%) which is iron-containing industrial waste is prepared as the reducing material 8, and the hot scarfer and the steel dust 7 are mixed together at a ratio of 1:1.

As shown in FIG. 2, initially, the steel dust 7 and the reducing material 8 are fed to the feeding portion 10 to mix them together.

Then, the to-be-treated mixed material 70 obtained by the mixing process 90 is fed to the first heating oven 11 by opening the valve 301 of the material passageway 31 of the treating equipment 1. Then, after the valve 301 is closed, the to-be-treated mixed material 70 is heated at about 200° C. for one hour and the vacuum pump 21 is actuated to exhaust the atmosphere inside the first heating oven 11 to the first recovery container 41. Consequently, the chlorine and the water separate from the to-be-treated mixed material 70 and are recovered by the first recovery container 41.

Then, after the chlorine recovery process 91 finishes, the to-be-treated mixed material 70 is fed to the second heating oven 12 by opening the valve 302 of the material passageway 32. Then, after the valve 302 is closed, the vacuum pump 22 is actuated to produce a vacuum at a degree of 0.5 Torr inside the second heating oven 12.

Then, the to-be-treated mixed material 70 is heated at about 600° C. for one hour. As a result, the lead in the to-be-treated mixed material 70 is reduced to metallic lead by the action of the reducing material 8 and vaporizes. Then, the metallic lead is condensed and recovered by the metal recovery container 52 kept at 200° C. lower than the condensation temperature of the metallic lead. The fluorine separated from the to-be-treated mixed material 70 is recovered by the second recovery container 42 positioned at the exhaust side of the vacuum pump 22.

After the lead recovery process 92 finishes, the to-be-treated mixed material 70 is fed to the third heating oven 13 by opening the valve 303 of the material passageway 33 of the treating equipment 1. At this time, a vacuum is produced at a degree of 0.5 Torr inside the third heating oven 13 by actuating the vacuum pump 23. In this manner, the lead recovery process 92 can be switched to the zinc recovery process 93, with the vacuum state maintained.

Then, after the valve 303 is closed, the to-be-treated mixed material 70 is heated at about 900° C. for two hours. As a result, zinc oxide is reduced to metallic zinc and vaporizes. Then, the metallic zinc which has vaporized is condensed and recovered by the metal recovery container 53 kept at 400° C. lower than the condensation temperature thereof. Other substances separated from the to-be-treated mixed material 70 are recovered by the third recovery container 43 positioned at the exhaust side of the vacuum pump 23.

Then, after the zinc recovery process 93 finishes, the residue 79 is fed to the briquette machine 14 by opening the valve 304 of the material passageway 34. At this time, too, the atmosphere inside the briquette machine 14 is made vacuum at a vacuum degree of 0.5 Torr by actuating the vacuum pump 24. In this manner, the zinc recovery process 93 can be switched to the residue recovery process 94, with the vacuum state maintained.

Then, the residue 79 is compression-molded into a briquette 795 by a compressor 141 of the briquette machine 14. In this manner, a series of the treatments are accomplished.

The briquette 795 thus obtained is recycled as a raw material of steel.

Tables 2, 3 and 4 show the results obtained by sampling and analyzing the components of the to-be-treated mixed material 70 obtained after the respective processes finish and the components of the material obtained from the metal recovery container 53.

Table 2 shows the values of the representative components of the to-be-treated mixed material 70 obtained immediately after the lead recovery process 92 finishes. AS indicated in table 2, the lead (Pb) and the fluorine (F) contained in the steel dust 7 at the initial stage shown in table 1 have been recovered sufficiently.

Table 3 shows the values of the representative components of the to-be-treated mixed material 70 obtained immediately after the zinc recovery process 93 finishes, namely, the representative components of the residue 79. As indicated in table 3, the zinc (zn) contained in the steel dust 7 at the initial stage shown in table 1 has been recovered sufficiently.

Table 4 shows the values of the components of the material obtained from the metal recovery container 53 in the zinc recovery process 93. As indicated in table 4, the recovered material contains the metallic zinc at a high purity of 89.2%.

Accordingly, in Embodiment 1, the recovered metallic zinc can be recycled without refining.

Further, as described above, in Embodiment 1, harmful substances such as lead can be recovered sequentially and the treatment period of time is comparatively short. Thus, the method of the present invention is suitable for on-site treatment.

TABLE 1

Value of components contained in steel dust (Embodiments 1–6)

| Component | Fe | Zn | Mn | Pb | Ca | Al | Cl | F | O |
|---|---|---|---|---|---|---|---|---|---|
| Content at % | 25.0 | 22.26 | 2.78 | 2.53 | 4.05 | 0.47 | 4.61 | 0.51 | Balance |

TABLE 2

Value of components contained in to-be-treated mixed material after lead recovery process (Embodiment 1)

| Component | Fe | Zn | Mn | Pb | Ca | Al | Cl | F | O |
|---|---|---|---|---|---|---|---|---|---|
| Content at % | 34.6 | 19.7 | 3.38 | 0.20 | 5.43 | 0.64 | 0.22 | 0.01 | Balance |

TABLE 3

Value of components contained in residue (Embodiment 1)

| Component | Fe | Zn | Mn | Pb | Ca | Al | Cl | F | O |
|---|---|---|---|---|---|---|---|---|---|
| Content at % | 72.50 | 0.01 | 3.80 | 0.20 | 5.60 | 0.68 | 0.23 | 0.01 | Balance |

TABLE 4

Value of recovered metallic zinc (Embodiment 1)

| Component | Fe | Zn | Mn | Pb | Ca | Al | Cl | F | O |
|---|---|---|---|---|---|---|---|---|---|
| Content at % | 0.72 | 89.2 | 0.04 | 0.02 | 0.01 | 0.01 | 0.20 | 0.01 | Balance |

Embodiment 2

In Embodiment 2, the correlation between the mixing amount of the reducing material 8 and the recovery percentage of the obtained metallic zinc was examined.

In the examination, the amount of the reducing material 8 necessary for reducing one mol of Zn (zinc) is set to one gram equivalent, and several gram equivalent ratios were used in a range of about 2.4–24 so as to prepare the to-be-treated mixed material 70. The to-be-treated mixed material 70 was treated in the procedure of Embodiment 1. As the recovery percentage of the obtained metallic zinc, the removal percentage determined by dividing the percentage (at %) of the zinc contained in the residue by the percentage (at %) of the zinc contained in the to-be-treated mixed material was used.

In Embodiment 2, the heating temperature was set to 900° C. and 750° C. in the zinc recovery process to examine the influence caused by each of the temperatures.

Figure 3:
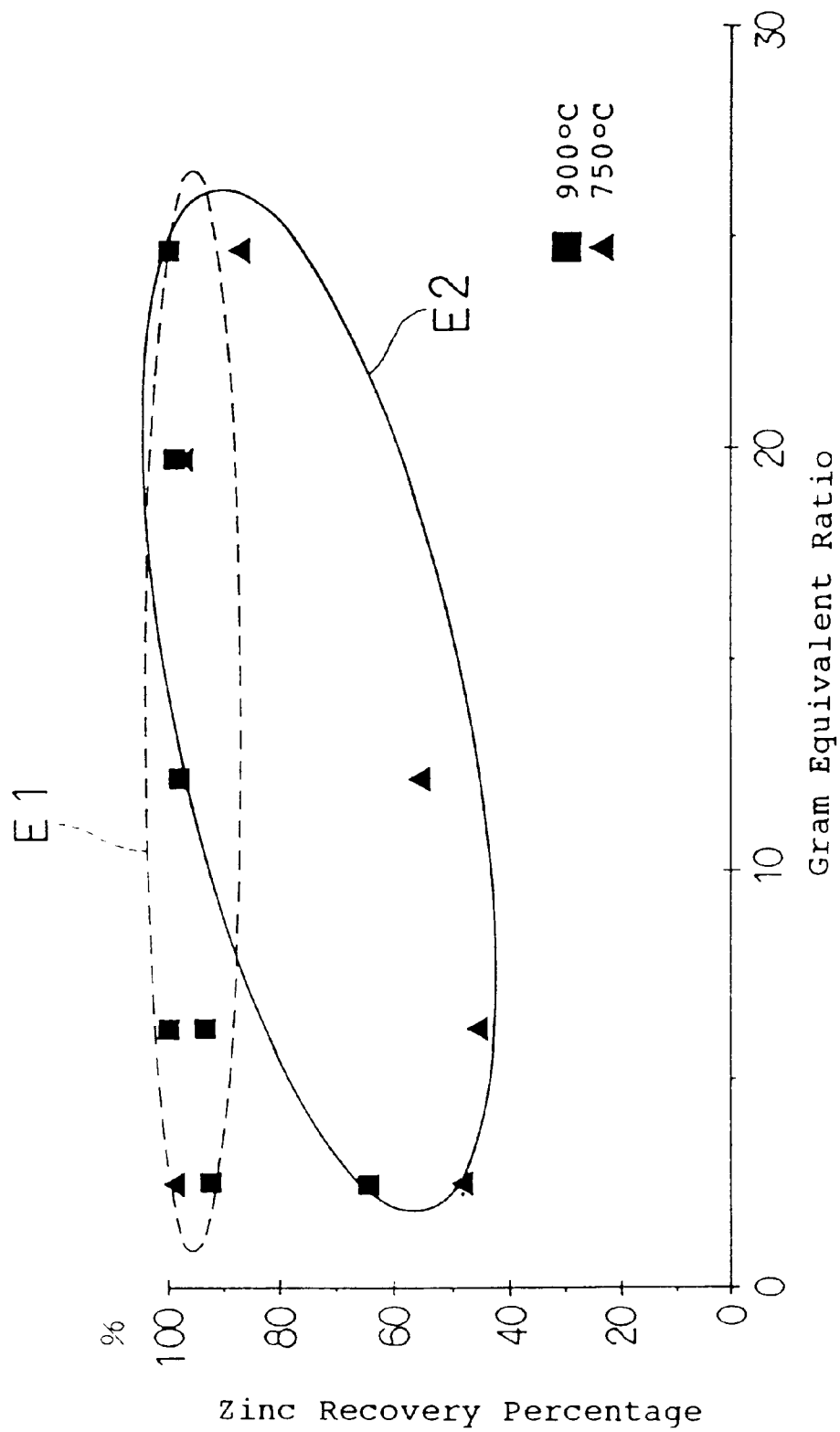
FIG. 3 is an explanatory view showing the relationship between the gram equivalent of a reducing material and a zinc recovery percentage according to Embodiment 2.

FIG. 3 shows the result. The gram equivalent ratio of the reducing material is shown on the abscissa and the recovery percentage (removal percentage) of the zinc is shown on the ordinate. The distribution state at the time when the heating temperature was 900° C. in the zinc recovery process is indicated by a dotted line E1 and that at the time when the heating temperature was 750° C. in the zinc recovery process is indicated by a solid line E2.

As indicated in FIG. 3, when the heating temperature in the zinc recovery process was 900° C., a high zinc recovery percentage was obtained in the entire measured region, irrespective of gram equivalent ratios. When the heating temperature in the zinc recovery process was 750° C., the zinc recovery percentage was high in the case where the gram equivalent ratio was high, whereas the zinc recovery percentage decreased as the gram equivalent ratio was lowered.

As will be understood from the foregoing description, when the heating temperature in the zinc recovery process was set to be higher than 900° C., high zinc recovery percentages can be always obtained by mixing the reducing material with the steel dust 7 such that the gram equivalent ratio is 2.4 or more.

Embodiment 3

Figure 4:
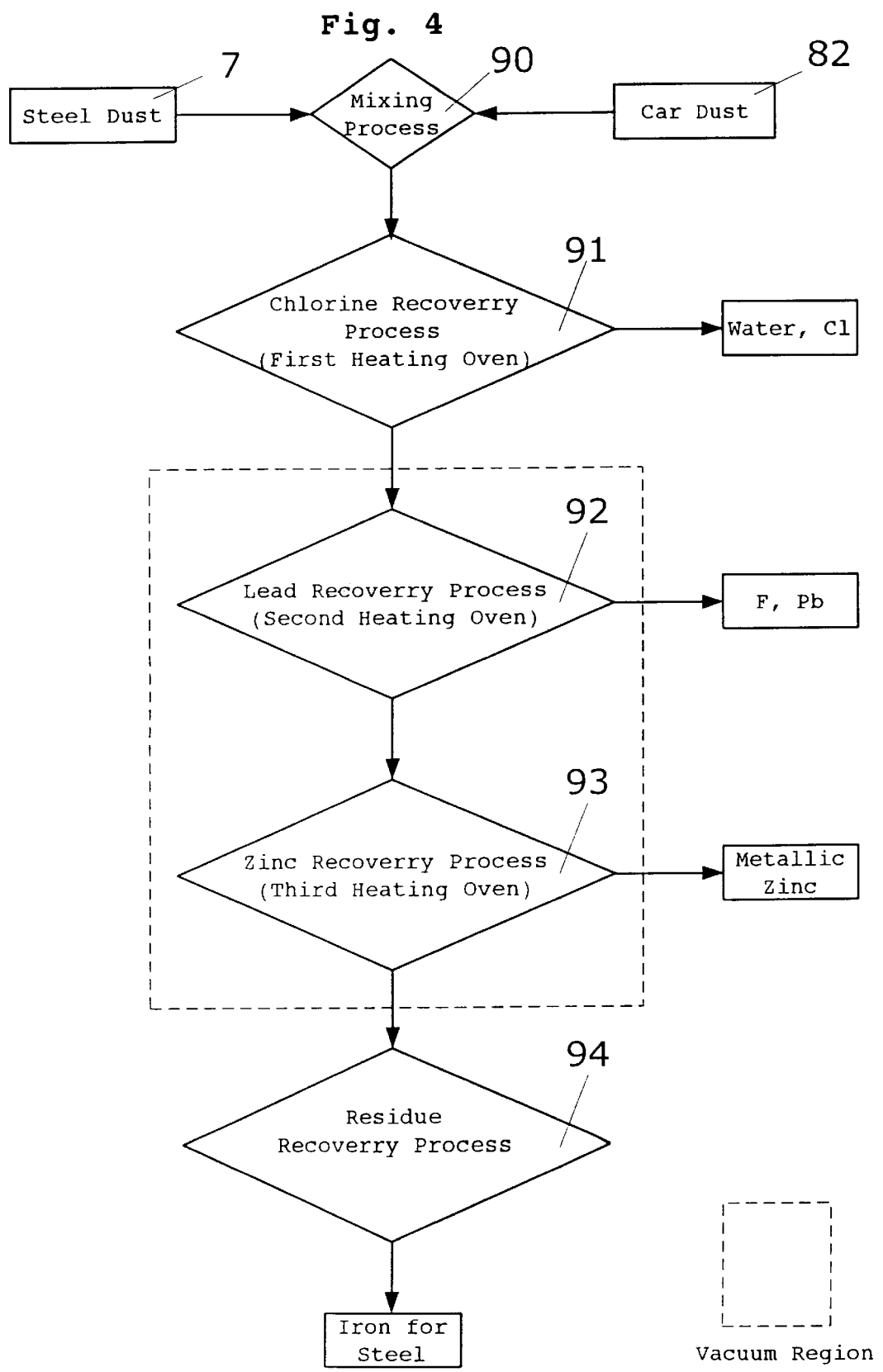
FIG. 4 is an explanatory view showing the process of a treating method according to Embodiment 3.

In Embodiment 3, as shown in FIG. 4, car dust 82 was used as the reducing material, unlike Embodiment 1. In the residue recovery process 94, the residue was not molded into the briquette. Embodiment 3 is similar to Embodiment 1 in other points.

The car dust 82 contains an organic material of a discarded automotive body from which metallic materials were excluded, thus consisting of the components shown in table 5. As indicated in table 5, the car dust 82 contains harmful substances such as lead (Pb) in addition to carbon (C) which constitutes the main component of the reducing material. Thus, needs existed for the development of an effective treating method. The method of Embodiment 3 is capable of treating the car dust itself as well as the steel dust by using the car dust having such a problem as the reducing material.

Namely, in Embodiment 3, the lead can be recovered by heating the to-be-treated mixed material under vacuum in the lead recovery process which is carried out by the second heating oven 12, similarly to Embodiment 1.

In the chlorine recovery process and the zinc recovery process, an operation similar to that of Embodiment 1 is obtained, and consequently the residue consisting of the components shown in table 6 is obtained.

As indicated in table 6, the residue is obtained in the state in which the harmful substances have been satisfactory removed from the car dust.

Metallic zinc obtained in the zinc recovery process of Embodiment 3 had a high purity, similarly to that obtained in Embodiment 1.

TABLE 5

Value of components contained in car dust (Embodiment 3)

| Component | C | Fe | Cu | Pb | Al | Cl | F | Zn | H |
|---|---|---|---|---|---|---|---|---|---|
| Content at % | 69.6 | 5.0 | 2.0 | 2.0 | 3.50 | <0.01 | <0.01 | 0.51 | 17.4 |

TABLE 6

Value of components contained in residue (Embodiment 3)

| Component | Fe | Zn | Mn | Pb | Ca | Al | Cl | F | O |
|---|---|---|---|---|---|---|---|---|---|
| Content at % | 36.0 | 0.01 | 3.50 | 0.20 | 5.44 | 0.80 | 0.21 | 0.05 | Balance |

Embodiment 4

Figure 5:
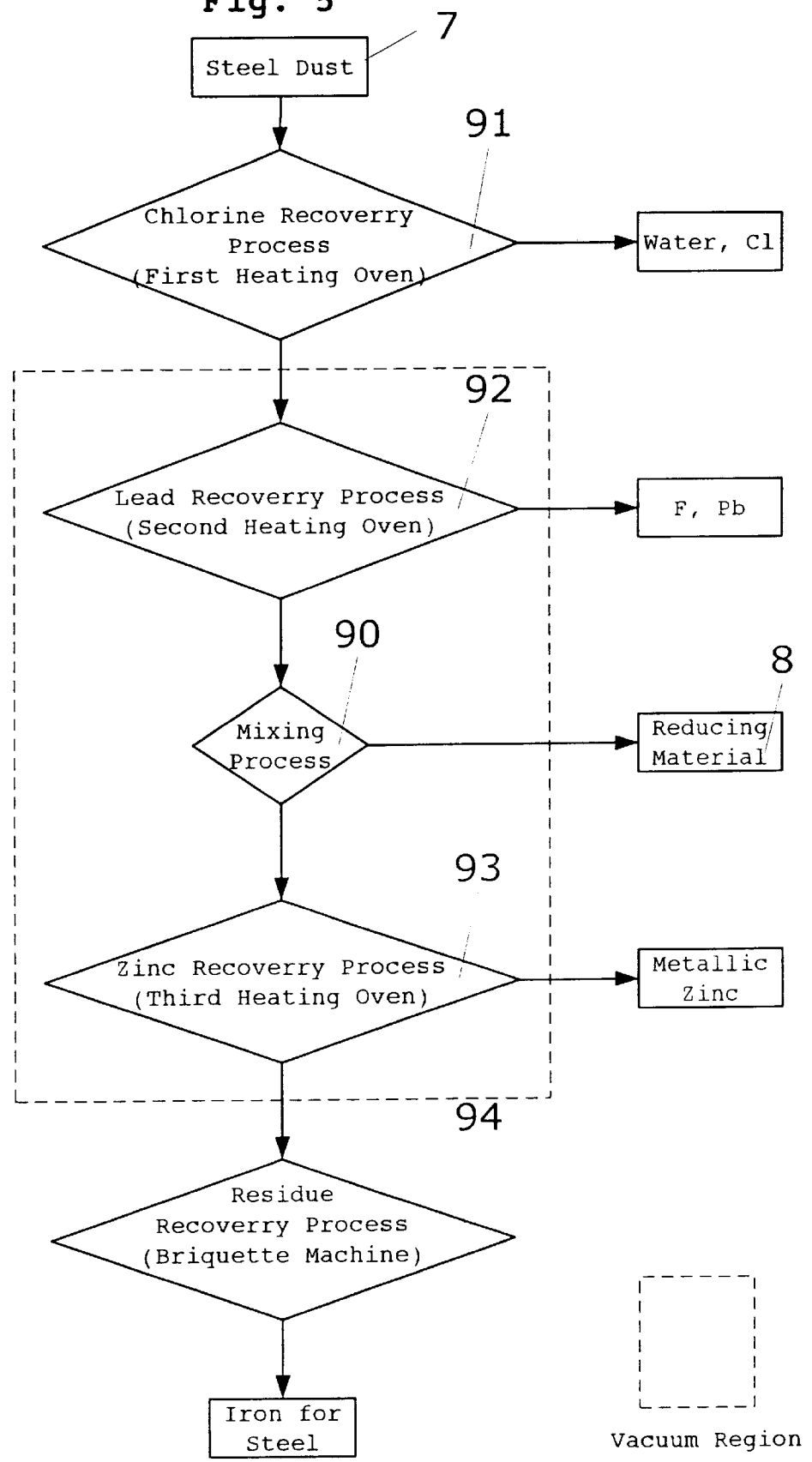
FIG. 5 is an explanatory view showing the process of a treating method according to Embodiment 4.

In this embodiment, as shown in FIG. 5, the chlorine recovery process 91 and the lead recovery process 92 are carried out before the reducing material 8 is added to the steel dust 7, and then, the mixing process 90 of mixing the reducing material 8 with the steel dust 7 is performed, and then, the zinc recovery process 93 and the residue recovery process 94 are performed.

The steel dust 7 and the reducing material 8 of this embodiment are similar to those of Embodiment 1.

Figure 6:
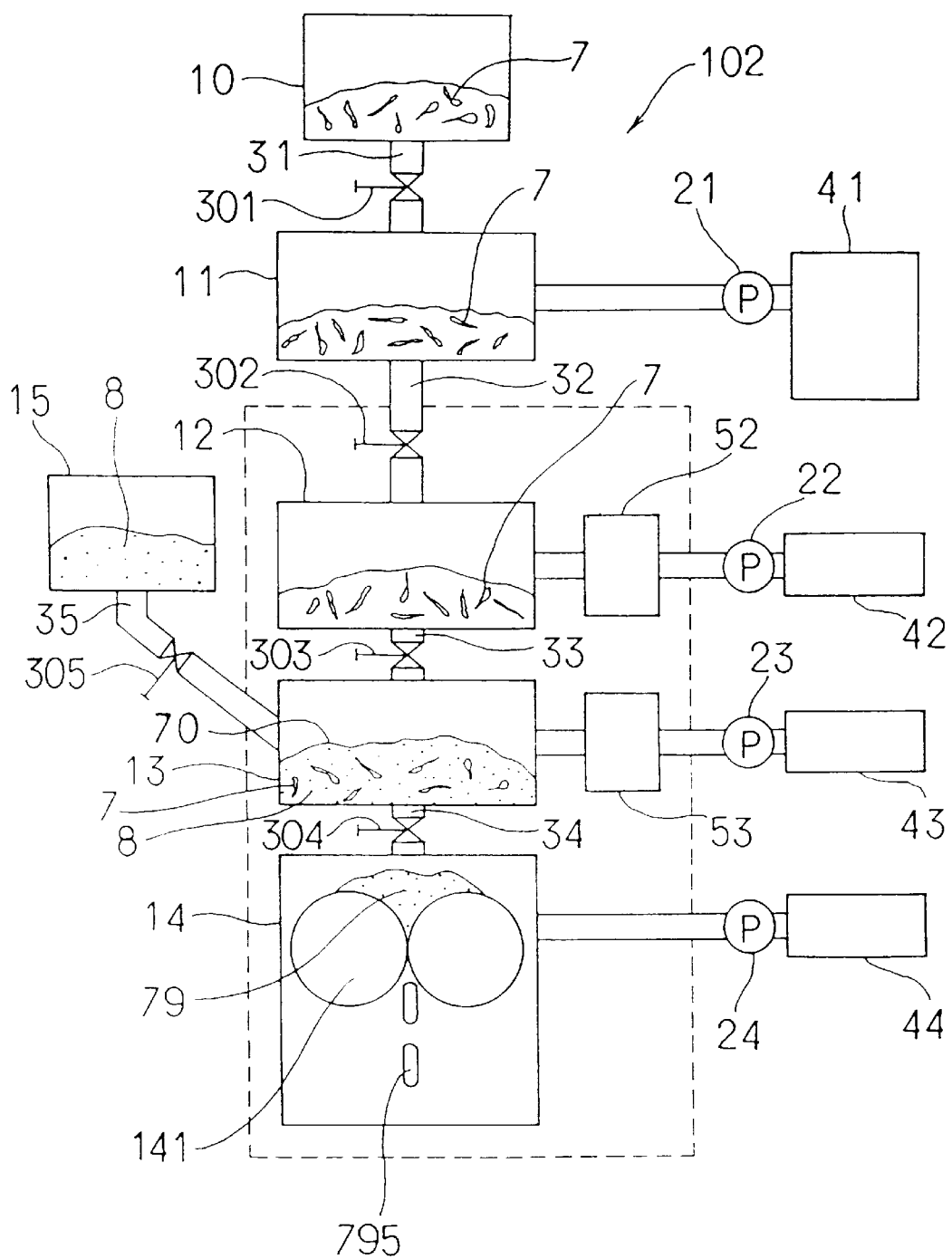
FIG. 6 is an explanatory view showing the construction of a treating equipment according to Embodiment 4.

That is, as shown in FIG. 6, unlike the treating equipment 1 of Embodiment 1, a treating equipment 102 of this embodiment comprises a reducing material-feeding portion 15 provided for the third heating oven 13. The reducing material-feeding portion 15 is connected with the third heating oven 13 through a reducing material passageway 35 having a valve 305 mounted thereon. Embodiment 4 is similar to Embodiment 1 in other points.

In treating the steel dust 7 by using the treating equipment 1, the steel dust 7 is fed from the feeding portion 10 to the first heating oven 11 in which the steel dust 7 is heated at about 400° C. for one hour to recover chlorine and water therefrom.

Then, the steel dust 7 is fed to the second heating oven 12 in which a vacuum having a vacuum degree of 0.5 Torr is produced so that the steel dust 7 is heated therein at about 600° C. for one hour to recover fluoride and lead.

Then, a vacuum is produced at a vacuum degree of 0.5 Torr in the third heating oven 13 to which the reducing material 8 has been fed from the reducing material-feeding portion 15, and the steel dust 7 which has passed the lead recovery process is fed to the third heating oven 13 so that the steel dust 7 and the reducing material 8 are mixed together to obtain the to-be-treated mixed material 70.

Then, in the third heating oven 13 in which the vacuum state is maintained, the to-be-treated mixed material 70 is heated for two hours at 900° C. higher than the temperature set in the lead recovery process. As a result, zinc is reduced and vaporized to recover metallic zinc by the metal recovery container 53.

After the zinc recovery process is completed, the residue 79 is compression-molded into a briquette 795 by the compressor 141 of the briquette machine 14 in which the vacuum state is maintained. In this manner, a series of the treatments is completed. Similarly to Embodiment 1, the respective valves are opened and closed to move the material in each process switching time. In the treating times, the valves are closed.

Embodiment 4 is similar to Embodiment 1 in other points.

Tables 7 through 9 show the results obtained by sampling and analyzing the components of the steel dust 7 obtained after the respective processes finish, the components of the to-be-treated mixed material 70, and the components of the material obtained from the metal recovery container 53.

Table 7 shows the values of the representative components of the steel dust 7 obtained immediately after the lead recovery process finishes. As indicated in table 7, the lead (Pb) and the fluorine (F) contained in the steel dust 7 at the initial stage shown in table 1 have been recovered sufficiently.

Table 8 shows the values of the representative components of the to-be-treated mixed material 70 obtained immediately after the zinc recovery process finishes, namely, the representative components of the residue 79. As indicated in table 8, the zinc (Zn) contained in the steel dust 7 at the initial stage shown in table 1 has been recovered sufficiently.

Table 9 shows the values of the components of the material obtained from the metal recovery container 53 in the zinc recovery process. As indicated in table 9, the recovered material contains the metallic zinc at a high purity of 92.0%. The purity is greater than that in Embodiment 1, which indicates that because the reducing reaction of the zinc can be restrained in the lead recovery process, the recovery of the zinc can be accomplished mainly in the zinc recovery process and thus the recovery percentage of the zinc can be improved in Embodiment 4.

The operation of this embodiment is similar to that of Embodiment 1 in other points.

TABLE 7

Value of components contained in to-be-treated mixed material after lead recovery process (Embodiment 4)

| Component | Fe | Zn | Mn | Pb | Ca | Al | Cl | F | O |
|---|---|---|---|---|---|---|---|---|---|
| Content at % | 35.7 | 20.5 | 4.49 | 0.24 | 6.50 | 0.62 | 0.50 | 0.05 | Balance |

TABLE 8

Value of components contained in residue (Embodiment 4)

| Component | Fe | Zn | Mn | Pb | Ca | Al | Cl | F | O |
|---|---|---|---|---|---|---|---|---|---|
| Content at % | 70.2 | 0.01 | 5.40 | 0.30 | 6.70 | 0.65 | 0.53 | 0.05 | Balance |

TABLE 9

Value of recovered metallic zinc (Embodiment 4)

| Component | Fe | Zn | Mn | Pb | Ca | Al | Cl | F | O |
|---|---|---|---|---|---|---|---|---|---|
| Content at % | 0.66 | 92.0 | 0.01 | 0.02 | 0.01 | 0.01 | 0.20 | 0.10 | 6.99 |

Embodiment 5

Figure 7:
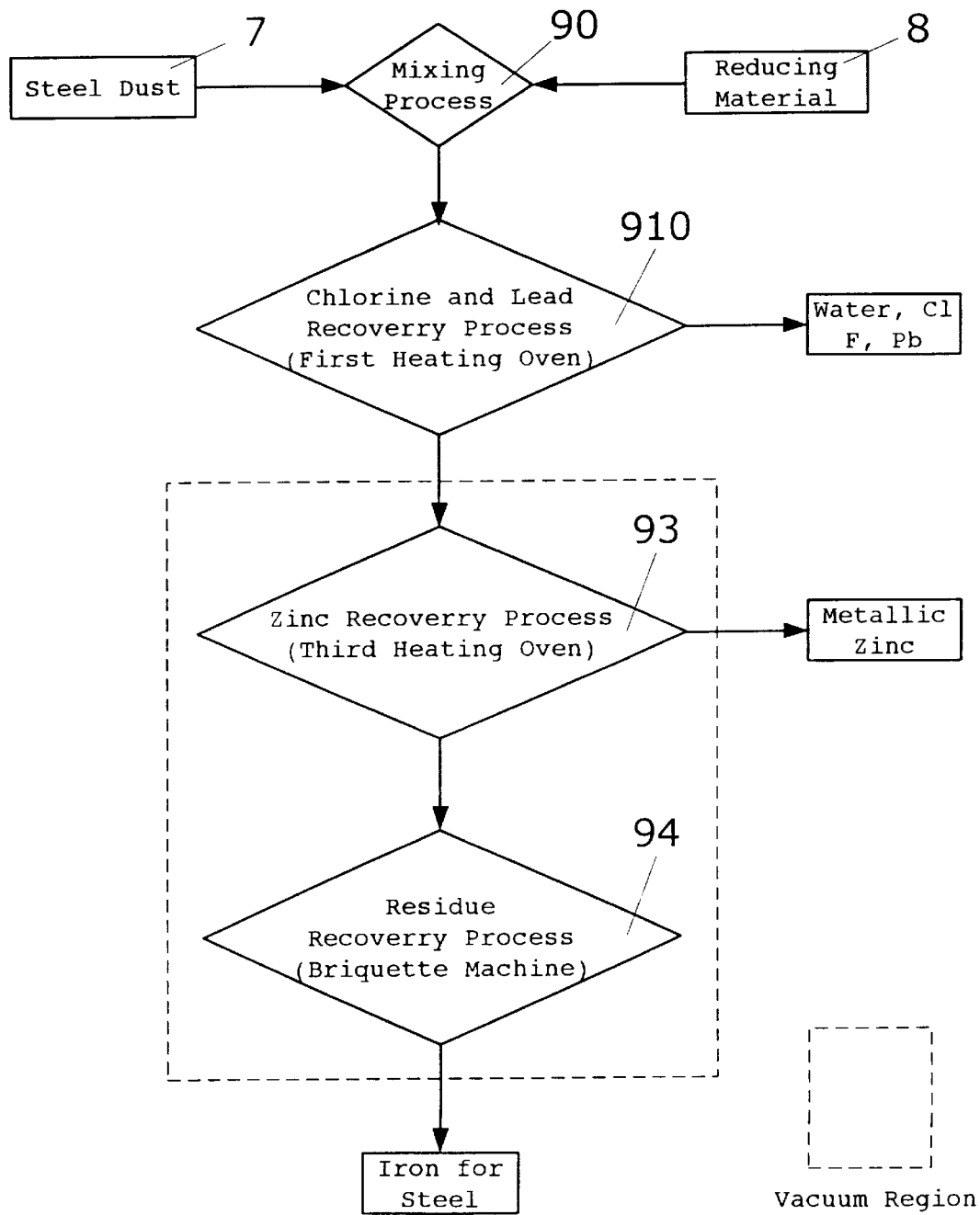
FIG. 7 is an explanatory view showing the process of a treating method according to Embodiment 5.

In this embodiment, as shown in FIG. 7, the chlorine recovery process and the lead recovery process which are performed in Embodiment 1 are done in the atmospheric environment as a chlorine and lead recovery process 910 by heating the to-be-treated mixed material one time.

The steel dust 7 and the reducing material 8 of this embodiment are similar to those of Embodiment 1. The treating equipment which is used in this embodiment does not have the second heating oven 12, unlike the treating equipment 1 of Embodiment 1.

Embodiment 5 is similar to Embodiment 1 in other points.

In treating the steel dust 7 in this embodiment, initially, the steel dust 7 and the reducing material 8 are mixed together to obtain the to-be-treated mixed material 70.

Then, the to-be-treated mixed material 70 is fed to the first heating oven in which the to-be-treated mixed material 70 is heated at about 600° C. in the atmospheric environment for two hours to perform the chlorine and lead recovery process 910 of recovering lead, chlorine, fluoride, and water.

Then, with the completion of the chlorine and lead recovery process 910, the to-be-treated mixed material 70 is fed to the third heating oven in which a vacuum having a vacuum degree of 0.5 Torr is produced. Then, the zinc recovery process of recovering metallic zinc by heating the to-be-treated mixed material 70 for two hours at 900° C. higher than the temperature set in the chlorine and lead recovery process 910 is carried out.

Then, the residue is compression-molded into a briquette in the residue recovery process, similarly to Embodiment 1. In this manner, a series of the treatments is completed.

Tables 10 through 12 show the results obtained by sampling and analyzing the components of the to-be-treated mixed material 70 after the respective processes finish and the components of the material obtained from the metal recovery container 53.

Table 10 shows the values of the representative components of the to-be-treated mixed material 70 obtained immediately after the chlorine and lead recovery process is completed. As indicated in table 10, the chlorine (Cl), the lead (Pb), and the fluorine (F) contained in the steel dust 7 at the initial stage shown in table 1 have been recovered sufficiently.

In this embodiment, the chlorine and lead recovery process is carried out in the atmospheric environment without producing a vacuum. The lead, the chlorine, the fluorine, and the water are volatilized by placing the to-be-treated mixed material 70 in a reducing atmosphere at a high temperature. Thus, the lead, the fluorine, and the like can be reliably recovered by placing the to-be-treated mixed material 70 therein for the volatilization time thereof.

Table 11 shows the values of representative components of the to-be-treated mixed material 70 immediately after the zinc recovery process finishes, namely, the representative components of the residue 79. As indicated in table 11, the zinc (Zn) contained in the steel dust 7 at the initial stage shown in table 1 has been recovered sufficiently.

Table 12 shows the values of the components of the material obtained from the metal recovery container 53 in the zinc recovery process. As indicated in table 12, the obtained material contains the metallic zinc at a high purity of 92.0%. The purity is higher than that in Embodiment 1, which indicates that because the reducing reaction of the zinc can be restrained by performing the chlorine and lead recovery process in the atmospheric environment, the recovery of the zinc can be accomplished mainly in the zinc recovery process and thus, the recovery percentage of the zinc can be improved in Embodiment 5.

The operation of this embodiment is similar to that of Embodiment 1 in other points.

TABLE 10

Value of components contained in to-be-treated mixed material after lead recovery process (Embodiment 5)

| Component | Fe | Zn | Mn | Pb | Ca | Al | Cl | F | O |
|---|---|---|---|---|---|---|---|---|---|
| Content at % | 35.7 | 20.5 | 4.49 | 0.24 | 6.50 | 0.62 | 0.40 | 0.01 | Balance |

TABLE 11

Value of components contained in residue (Embodiment 5)

| Component | Fe | Zn | Mn | Pb | Ca | Al | Cl | F | O |
|---|---|---|---|---|---|---|---|---|---|
| Content at % | 70.2 | 0.01 | 5.40 | 0.30 | 6.70 | 0.65 | 0.41 | 0.01 | Balance |

TABLE 12

Value of recovered metallic zinc (Embodiment 5)

| Component | Fe | Zn | Mn | Pb | Ca | Al | Cl | F | O |
|---|---|---|---|---|---|---|---|---|---|
| Content at % | 0.66 | 92.0 | 0.01 | 0.02 | 0.01 | 0.01 | 0.01 | 0.01 | Balance |

In Embodiments 1 through 5, one heating oven is specifically used for each process, but one heating oven may be used for a plurality of processes by adopting a method of sequentially changing the heating condition.

INDUSTRIAL APPLICABILITY

As described above, the present invention provides a method of treating a zinc oxide-containing waste capable of recovering metallic zinc therefrom at a high purity and accomplishing the on-site treatment of the waste.

What is claimed is:

1. A treating method of recovering zinc in the metal state from a waste containing the zinc in the oxide state, lead, chlorine, fluorine, and water, comprising:
   a mixing process of mixing the waste and a reducing material together to obtain a to-be-treated mixed material;

a chlorine recovery process of recovering the chlorine and the water by heating the to-be-treated mixed material;

a lead recovery process of recovering the fluorine and the lead by heating the to-be-treated mixed material under a vacuum state;

a zinc recovery process of reducing and vaporizing the zinc to recover metallic zinc by heating the to-be-treated mixed material at a temperature higher than that set in the lead recovery process, with the vacuum state maintained; and a residue recovery process of recovering a residue of the to-be-treated mixed material.

2. The treating method according to claim 1, wherein the to-be-treated mixed material is heated at 40–600° C. in the chlorine recovery process.

3. The treating method according to claim 1, wherein the to-be-treated mixed material is heated at 200–600° C. in the lead recovery process.

4. The treating method according to claim 3, wherein the reducing material consists of car dust comprising organic substances recovered from materials of discarded automotive bodies.

5. The treating method according to claim 1, wherein the to-be-treated mixed material is heated at 600–1,100° C. in the zinc recovery process.

6. The treating method according to claim 1, wherein in the residue recovery process, the residue is recovered by compression-molding the residue into a briquette, with the vacuum state maintained.

7. The treating method according to claim 1, wherein the reducing material consists of one or more industrial wastes selected from iron-containing industrial wastes containing Fe and/or FeO and carbon-containing industrial wastes containing carbon.

8. The treating method according to claim 1, wherein the reducing material consists of car dust comprising organic substances recovered from materials of discarded automotive bodies.

9. The treating method according to claim 1, wherein the degree of vacuum in the vacuum state in each of the processes is 0.001–20 Torr.

10. A treating method of recovering zinc in the metal state from a waste containing the zinc in the oxide state, lead, chlorine, fluorine, and water, comprising:

a chlorine recovery process of recovering the chlorine and the water by heating the waste;

a lead recovery process of recovering the fluorine and the lead by heating the waste in a vacuum state;

a mixing process of mixing a reducing material with the waste with the vacuum state maintained to obtain a to-be-treated mixed material;

a zinc recovery process of reducing and vaporizing the zinc to obtain metallic zinc by heating the to-be-treated mixed material, with the vacuum state maintained; and a residue recovery process of recovering a residue of the to-be-treated mixed material.

11. The treating method according to claim 10, wherein the waste is heated at 40–900° C. in the chlorine recovery process.

12. The treating method according to claim 10, wherein the waste is heated at 200–900° C. in the lead recovery process.

13. The treating method according to claim 10, wherein the to-be-treated mixed material is heated at 600–1,100° C. in the zinc recovery process.

14. The treating method according to claim 10, wherein in the residue recovery process, the residue is recovered by compression-molding the residue into a briquette, with the vacuum state maintained.

15. The treating method according to claim 10, wherein the reducing material consists of one or more industrial wastes selected from iron-containing industrial wastes containing Fe and/or FeO and carbon-containing industrial wastes containing carbon.

16. The treating method according to claim 10, wherein the reducing material consists of car dust comprising organic substances recovered from materials of discarded automotive bodies.

17. The treating method according to claim 10, wherein the degree of vacuum in the vacuum state in each of the processes is 0.001–20 Torr.

18. A treating method of recovering zinc in the metal state from a waste containing the zinc in the oxide state, lead, chlorine, fluorine, and water, comprising:

a mixing process of mixing the waste and a reducing material together to obtain a to-be-treated mixed material;

a chlorine and lead recovery process of recovering the lead, the chlorine, the fluorine, and the water by heating the to-be-treated mixed material;

a zinc recovery process of reducing and vaporizing the zinc to obtain metallic zinc by heating the to-be-treated mixed material in a vacuum state; and a residue recovery process of recovering a residue of the to-be-treated mixed material.

19. The treating method according to claim 18, wherein the to-be-treated mixed material is heated at 40–750° C. in the chlorine and lead recovery process.

20. The treating method according to claim 18, wherein the to-be-treated mixed material is heated at 600–1,100° C. in the zinc recovery process.

21. The treating method according to claim 18, wherein in the residue recovery process, the residue is recovered by compression-molding the residue into a briquette, with the vacuum state maintained.

22. The treating method according to claim 18, wherein the reducing material consists of one or more industrial wastes selected from iron-containing industrial wastes containing Fe and/or FeO and carbon-containing industrial wastes containing carbon.

23. The treating method according to claim 18, wherein the degree of vacuum in the vacuum state in each of the processes is 0.001–20 Torr.

* * * * *